United States Patent
Yi et al.

(10) Patent No.: US 10,231,235 B2
(45) Date of Patent: Mar. 12, 2019

(54) METHOD AND APPARATUS FOR CONFIGURING SYNCHRONIZATION REFERENCE IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 15/317,845

(22) PCT Filed: Jun. 12, 2015

(86) PCT No.: PCT/KR2015/005971
§ 371 (c)(1),
(2) Date: Dec. 9, 2016

(87) PCT Pub. No.: WO2015/190890
PCT Pub. Date: Dec. 17, 2015

(65) Prior Publication Data
US 2017/0118001 A1    Apr. 27, 2017

Related U.S. Application Data

(60) Provisional application No. 62/023,189, filed on Jul. 11, 2014, provisional application No. 62/011,091, filed on Jun. 12, 2014.

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/001* (2013.01); *H04L 5/0048* (2013.01);
(Continued)

(58) Field of Classification Search
CPC .... H04L 5/0094; H04L 5/0048; H04W 24/10; H04W 56/00; H04W 72/0453
(Continued)

(56) References Cited

U.S. PATENT DOCUMENTS

2004/0147287 A1    7/2004  Nelson, Jr.
2012/0020229 A1    1/2012  Dayal et al.
(Continued)

FOREIGN PATENT DOCUMENTS

CN    103039107 A    4/2013
CN    103563317 A    2/2014
(Continued)

OTHER PUBLICATIONS

Interdigital, "Small Cell On/Off Mechanism," 3GPP TSG-RAN WG1 Meeting #76bis, R1-141554, Shenzhen, China, Mar. 31-Apr. 4, 2014, 3 pages.
(Continued)

*Primary Examiner* — Phong La
(74) *Attorney, Agent, or Firm* — Birch, Stewart, Kolasch & Birch, LLP

(57) ABSTRACT

A method and apparatus for performing time/frequency tracking in a wireless communication system is provided. A user equipment (UE) receives a configuration of a frequency or a carrier for a time/frequency tracking reference carrier, and performs time/frequency tracking in an unlicensed carrier based on the received configuration.

9 Claims, 7 Drawing Sheets

(51) Int. Cl.
*H04W 24/10* (2009.01)
*H04W 56/00* (2009.01)
*H04L 27/26* (2006.01)
*H04L 27/00* (2006.01)
*H04W 16/14* (2009.01)

(52) U.S. Cl.
CPC .......... *H04L 5/0094* (2013.01); *H04L 5/0096* (2013.01); *H04L 27/0006* (2013.01); *H04L 27/2601* (2013.01); *H04W 24/10* (2013.01); *H04W 56/00* (2013.01); *H04W 16/14* (2013.01)

(58) Field of Classification Search
USPC ......................................................... 370/329
See application file for complete search history.

(56) References Cited

U.S. PATENT DOCUMENTS

| | | |
|---|---|---|
| 2013/0010715 A1 | 1/2013 | Dinan |
| 2014/0031054 A1 | 1/2014 | Zou et al. |
| 2014/0036881 A1 | 2/2014 | Kim et al. |
| 2014/0044105 A1 | 2/2014 | Bontu et al. |
| 2014/0071937 A1 | 3/2014 | Klatt |
| 2015/0009898 A1* | 1/2015 | Rosa ............... H04L 5/0048 370/328 |
| 2015/0117314 A1* | 4/2015 | Gou ............... H04W 56/0035 370/328 |
| 2015/0256305 A1* | 9/2015 | Yerramalli ............ H04W 76/38 370/311 |
| 2015/0296359 A1* | 10/2015 | Edge ............... H04W 4/22 455/404.2 |
| 2015/0373674 A1* | 12/2015 | Han ............... H04W 16/14 370/329 |
| 2016/0007307 A1* | 1/2016 | Wei ............... H04W 56/001 370/328 |
| 2016/0269978 A1* | 9/2016 | Bashar ............... H04J 11/00 |
| 2016/0301504 A1* | 10/2016 | Toskala ............... H04W 48/16 |
| 2016/0337176 A1* | 11/2016 | Lindoff ............... H04W 16/14 |
| 2016/0337177 A1* | 11/2016 | Lindoff ............... H04W 16/14 |
| 2016/0337997 A1* | 11/2016 | Huang ............... H04L 7/04 |
| 2017/0318569 A1* | 11/2017 | Dinan ............... H04W 72/0406 |
| 2018/0109968 A1* | 4/2018 | Luo ............... H04L 27/0006 |

FOREIGN PATENT DOCUMENTS

| | | |
|---|---|---|
| EP | 3148262 A1 | 3/2017 |
| WO | WO 2013/010323 A1 | 1/2013 |
| WO | WO 2013/063808 A1 | 5/2013 |
| WO | WO 2013/071506 A1 | 5/2013 |
| WO | WO 2013/179095 A1 | 12/2013 |
| WO | WO 2014/007593 A1 | 1/2014 |

OTHER PUBLICATIONS

Qualcomm Incorporated, "Small Cell On/Off Time Reduction," 3GPP TSG-RAN WG1 #77, R1-141956, May 19-23, 2014 (EPO Server Date May 18, 2014), Seoul, Korea, pp. 1-6, XP050787553.
3GPP TS 36.300 V12.1.0 (Mar. 2014), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Technical Specification, published on Mar. 2014.

* cited by examiner

[Fig. 1]
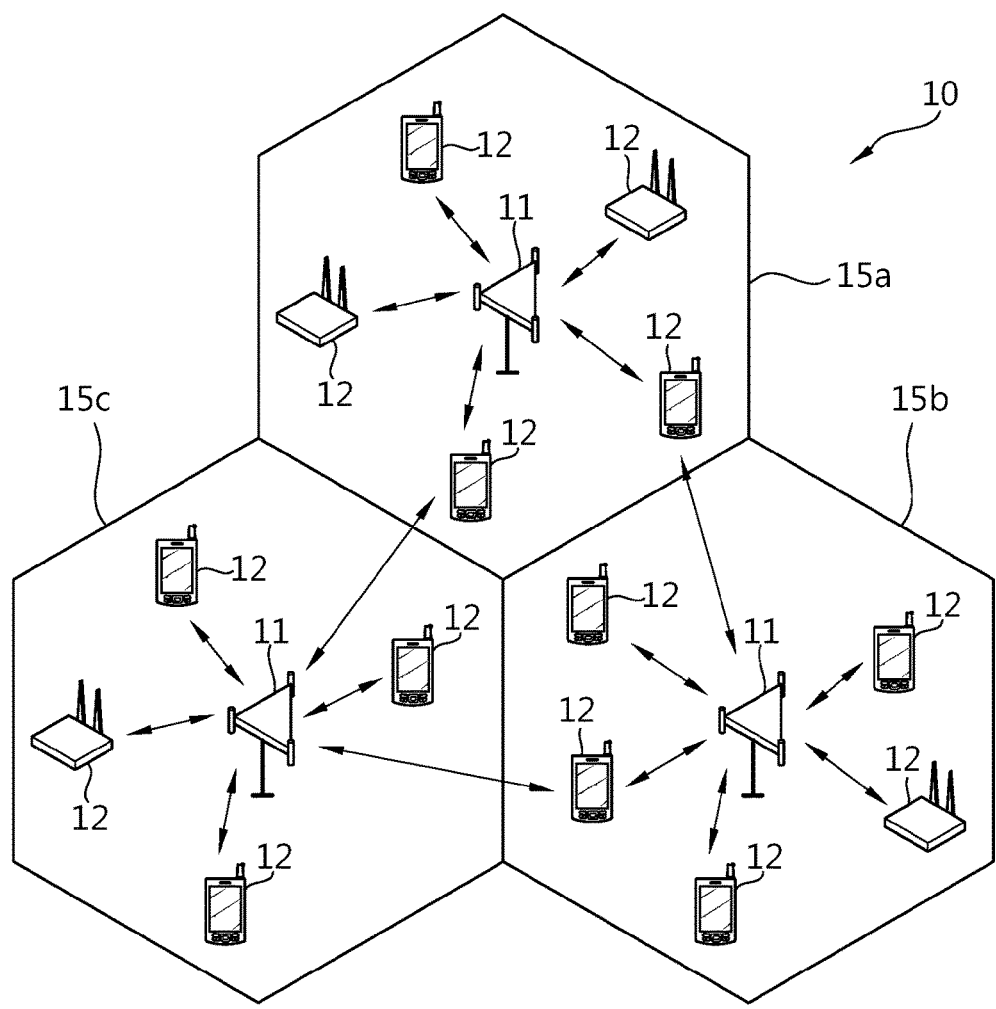
[Fig. 2]
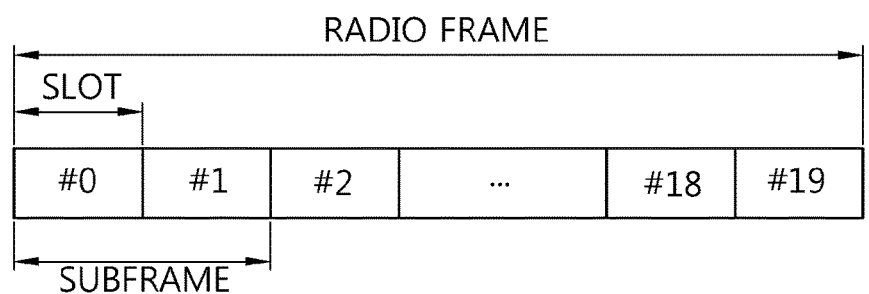

[Fig. 3]
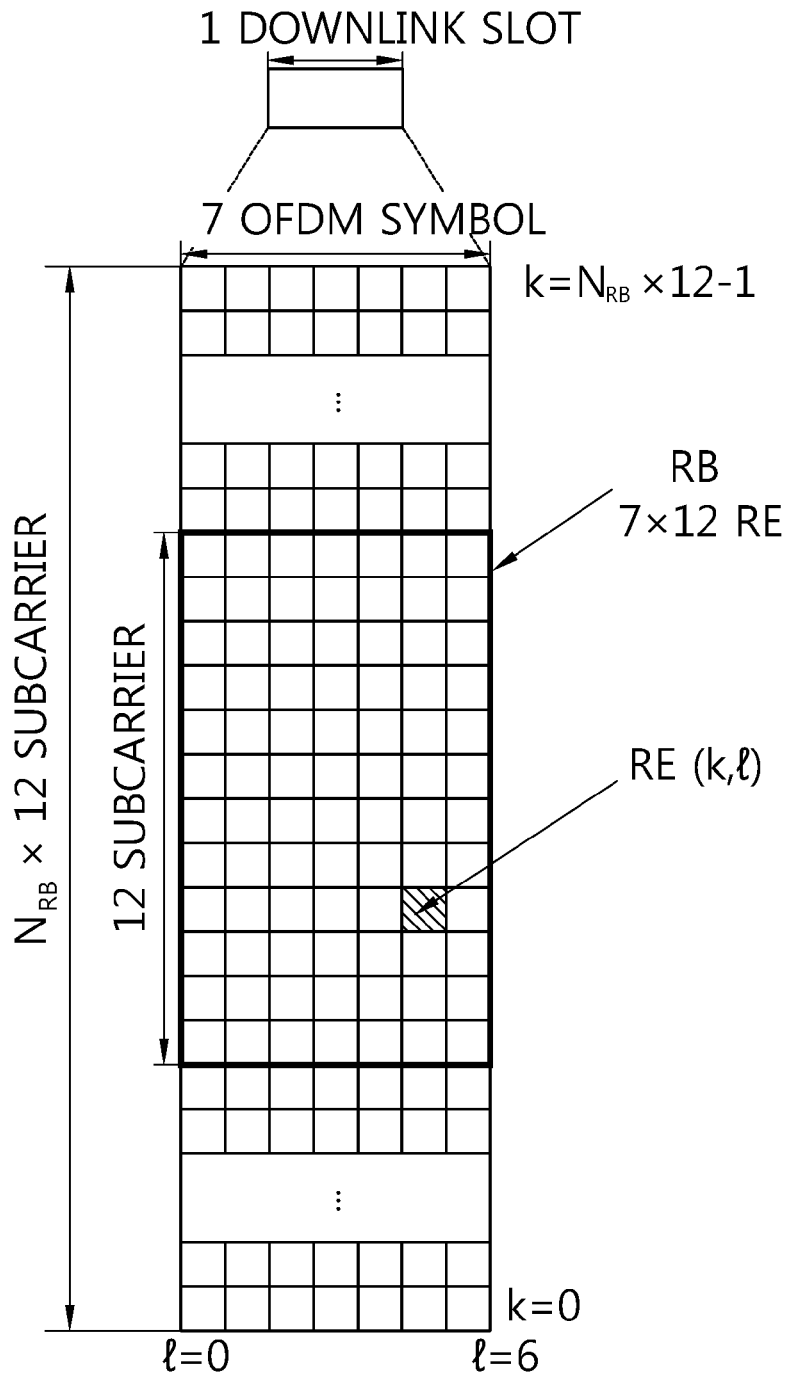

[Fig. 4]
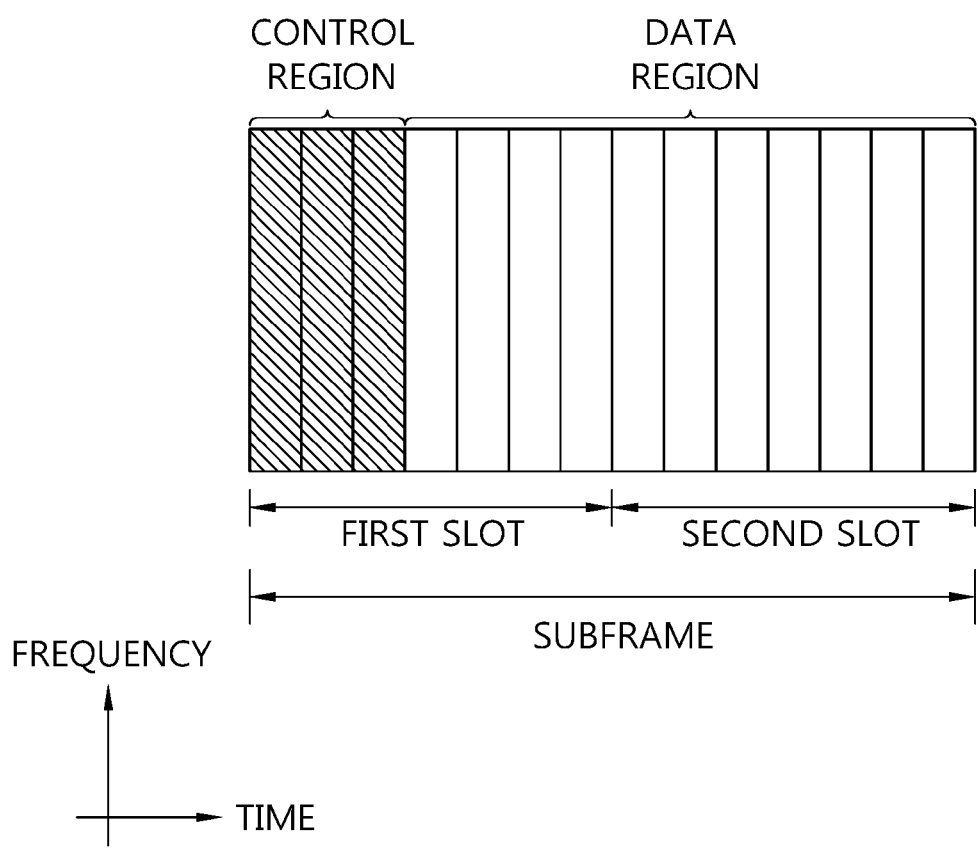

[Fig. 5]
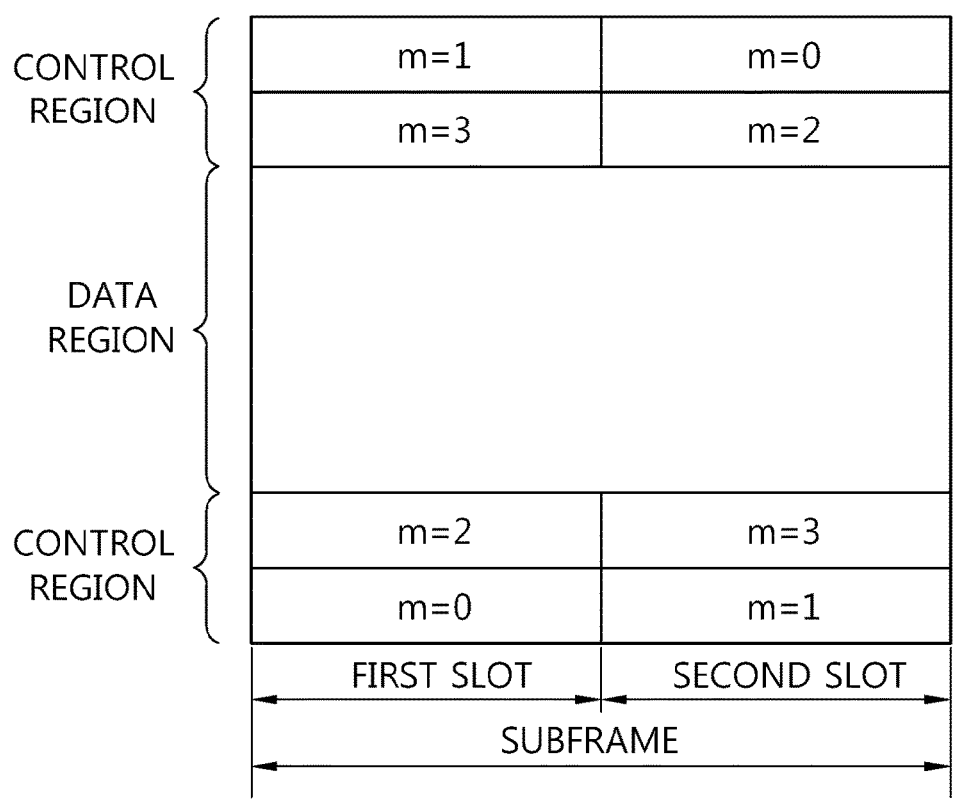

[Fig. 6]
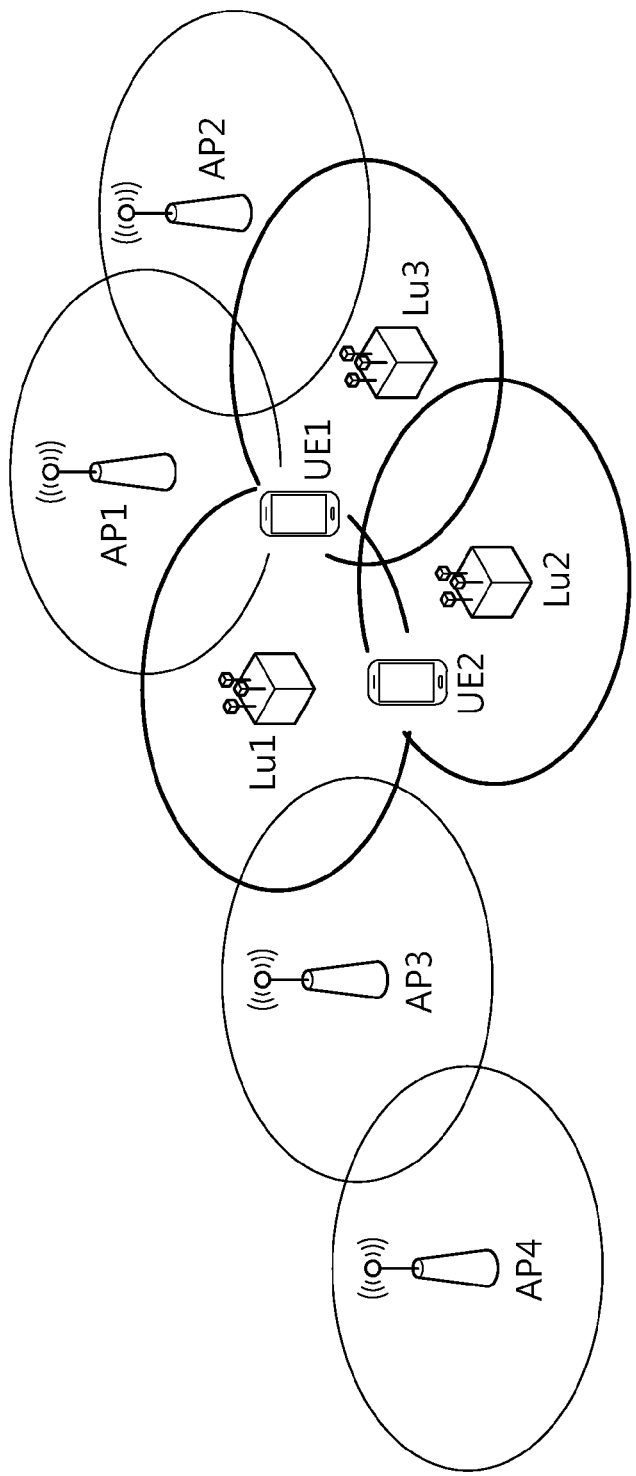

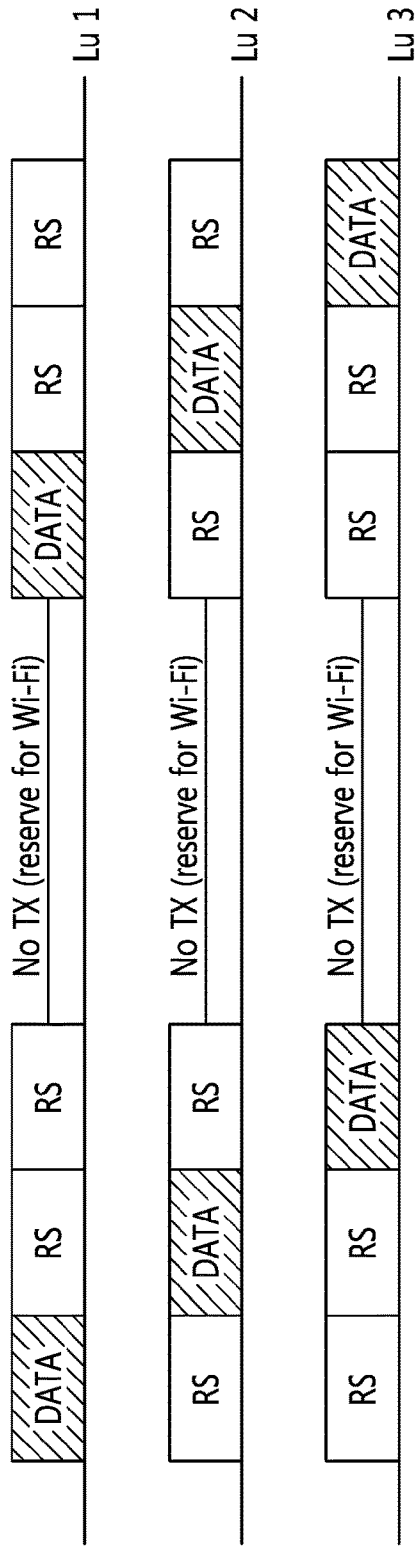
[Fig. 7]

[Fig. 8]
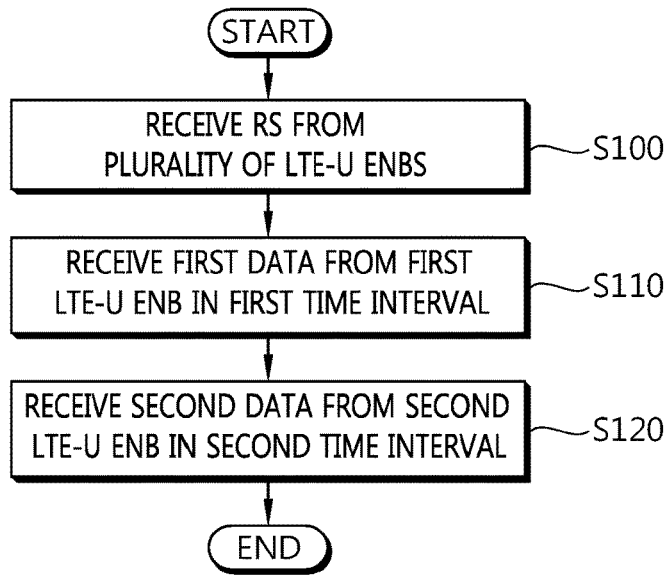
[Fig. 9]
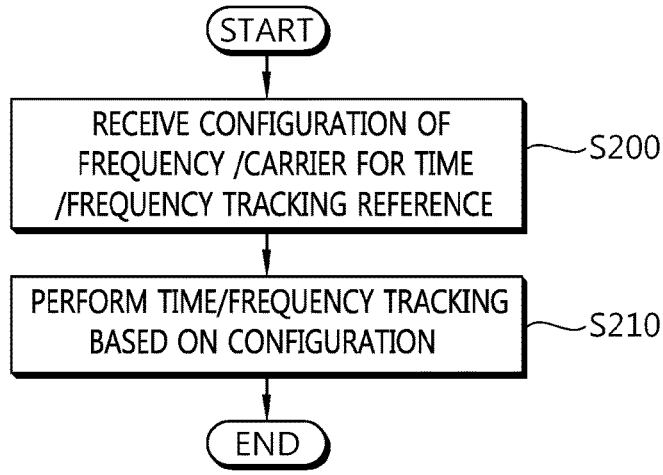
[Fig. 10]
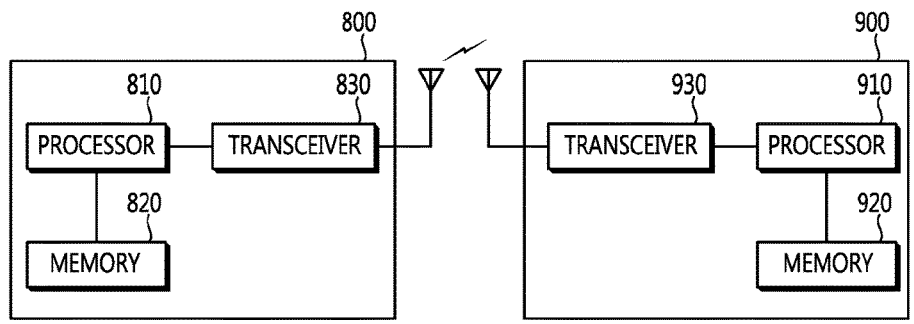

METHOD AND APPARATUS FOR CONFIGURING SYNCHRONIZATION REFERENCE IN WIRELESS COMMUNICATION SYSTEM

CROSS REFERENCE TO RELATED APPLICATIONS

This application is the National Phase of PCT International Application No. PCT/KR2015/005971, filed on Jun. 12, 2015, which claims priority under 35 U.S.C. 119(e) to U.S. Provisional Application Nos. 62/011,091 filed on Jun. 12, 2014 and 62/023,189 filed on Jul. 11, 2014, all of which are hereby expressly incorporated by reference into the present application.

TECHNICAL FIELD

The present invention relates to wireless communications, and more particularly, to a method and apparatus for configuring a synchronization reference in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As the demands on data rate keeps increasing, the utilization/exploration on new spectrum and/or higher data rate is essential. As one of a promising candidate, utilizing unlicensed spectrum, such as 5 GHz unlicensed national information infrastructure (U-NII) radio band, is being considered. A method for operating in unlicensed spectrum efficiently may be required.

DISCLOSURE OF INVENTION

Technical Problem

The present invention provides a method and apparatus for configuring a synchronization reference in a wireless communication system. The present invention provides a method and apparatus for configuring frequency/carrier for a time/frequency tracking reference carrier. The present invention provides a method and apparatus for performing time/frequency tracking in an unlicensed carrier based on configuration.

Solution to Problem

In an aspect, a method for performing, by a user equipment (UE), time/frequency tracking in a wireless communication system is provided. The method includes receiving a configuration of a frequency or a carrier for a time/frequency tracking reference carrier, and performing time/frequency tracking in an unlicensed carrier based on the received configuration.

In another aspect, a user equipment (UE) includes a memory, a transceiver, and a processor coupled to the memory and the transceiver, and configured to control the transceiver to receive a configuration of a frequency or a carrier for a time/frequency tracking reference carrier, and perform time/frequency tracking in an unlicensed carrier based on the received configuration.

In another aspect, a method for receiving, by a user equipment (UE), data in a wireless communication system is provided. The method includes receiving a reference signal from a plurality of long-term evolution on unlicensed spectrum (LTE-U) evolved NodeBs (eNBs), receiving first data from a first LTE-U eNB, among the plurality of LTE-U eNBs, in a first time interval, and receiving second data from a second LTE-U eNB, among the plurality of LTE-U eNBs, in a second time interval.

Advantageous Effects of Invention

Time/frequency tracking in an unlicensed carrier can be available by using a signal from a time/frequency tracking reference carrier.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of cooperation of LTE-U eNBs to prevent hidden-nodes from a UE according to an embodiment of the present invention.
FIG. 7 shows another example of cooperation of LTE-U eNBs to prevent hidden-nodes from a UE according to an embodiment of the present invention.
FIG. 8 shows an example of a method for performing cooperation between LTE-U eNBs according to an embodiment of the present invention.
FIG. 9 shows an example of a method for performing time/frequency tracking according to an embodiment of the present invention.
FIG. 10 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. It may be referred to Section 5.5 and 7.5 of 3GPP TS 36.300 V12.1.0 (2014-03). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell, i.e. while in connected mode, UEs need not acquire broadcasted system information directly from the SCells.

In unlicensed spectrum where LTE devices may coexist with other radio access technology (RAT) devices such as Wi-Fi, Bluetooth, etc., it is necessary to allow a UE behavior adapting various scenarios. In LTE in unlicensed spectrum (LTE-U), various aspects for 3GPP LTE described above may not be applied for LTE-U. For example, the TTI described above may not be used for LTE-U carrier where variable or floating TTI may be used depending on the schedule and/or carrier sensing results. For another example, in LTE-U carrier, rather than utilizing a fixed DL/UL configuration, dynamic DL/UL configuration based on scheduling may be used. However, due to UE characteristics, either DL or UL transmission may occur at time. For another example, different number of subcarriers may also be utilized for LTE-U carrier.

Hereinafter, inter-operator coordination for coexistence in LTE-U spectrum according to an embodiment of the present invention is described. Different from the licensed carrier cases where each operator is allocated with dedicated frequency and thus coexistence of different operators may not be critical issue, utilizing unlicensed carrier may require tight coordination and coexistence mechanisms among operators.

First, duplex mode may need to be coordinated and agreed. For example, if FDD is deployed in the unlicensed carrier, DL/UL frequency should be fixed. Or, if TDD is used, DL/UL configurations should be aligned among different operators in the same or adjacent frequencies. Alternatively, only DL subframes of DL/UL configurations may be used to avoid interferences.

Another approach is to use different maximum power for DL and UL transmission such that DL transmission from another eNB may have similar impact from interference perspective on UL reception. Or, each eNB may use different UL frequency resources where DL transmission may use lower power on those frequencies used by neighbor cells UL transmission. For this, each eNB may propagate its intended UL spectrum/frequency to be used (or preferred frequency list) where the neighbor cells upon receiving those frequencies, and accordingly, the DL power on those spectrum may be reduced. Another approach is to avoid scheduling DL on those frequencies. Another approach is to transmit intended DL/UL configuration among cells with some information to infer the timing of intended DL/UL configuration. One example is to transmit current time of the cell and offset, when the intended DL/UL configuration starts such that the neighbor cells can estimate the overall DL/UL configurations. Based on the configuration, the cell may perform power control to minimize some interference. Or, time information where each cell wants to protect may be also signaled.

In summary, in terms of intended resources (time/frequency locations) that the network wants to protect may be exchanged among cells. For inter-operator case, those information may be exchanged via operations, administration and maintenance (OAM) or via other external means. Alternatively, it may be exchanged via air interface where those information may be forwarded by a UE. For those, a common beacon channel may be defined which may be used by any operator to propagate any information for inter-operator coordination or better interference handling, or supporting cell search information, or other information which are common regardless of supported operators such as safety messages and/or emergency messages.

Secondly, synchronization among eNBs may become an issue. It is likely that LTE-U is supported as SCell rather than PCell. In this case, it is highly possible that PCell (or overlaid macro cell) may not be synchronized each other. Thus, if PCell and SCell is synchronized, LTE-U eNBs may not be synchronized each other in unlicensed carrier. However, this makes inter-cell interference coordination (ICIC) and other coordination very challenging.

Thus, according to an embodiment of the present invention, it may be assumed that LTE-U eNBs are synchronized in the LTE-U band regardless of PCell synchronization. Even though PCell is not synchronized or the overlaid macro cells are not synchronized, it may be assumed that LTE-U eNBs are synchronized in the LTE-U frequencies. This implies that PCell and SCell may not be synchronized even though two are configured to the UE via CA. In this case, either the network may inform the offset between two LTE-U eNBs or the UE may measure the offset and report the offset to the network. However, if SCells perform synchronization among each other based on network listening, or other means, the offset between PCell and SCell may be different. Thus, the offset may be updated periodically and broadcasted via cell common messages. In this case, cross-carrier scheduling may be applied to the same subframe index regardless of offset.

For example, if PCell and SCell has two subframes offset (PCell: n-th subframe, SCell: n+2-th subframe), (E)PDCCH scheduled in n-th subframe from PCell may be applicable to n-th subframe of SCell (which is 2 subframes before the current time). By this way, even with cross-subframe scheduling as it is, it may refer previous subframe scheduling. The ON/OFF indication may follow the same concept. L1 on/off indication transmitted in n-th subframe from PCell may be applicable to n-th subframe of SCell (for the duration that L1 on/off indication is indicating). Or, the network may configure cross-carrier-offset values that cross-carrier subframe should apply. For example, cross-carrier-offset may be configured as one, and it means that (E)PDCCH scheduled at n-th subframe may be applicable in n+1 subframe of SCell. If the subframe offset between two LTE-U eNBs is 2, then cross-carrier scheduling refers the one-subframe before.

For another example, when asynchronous case is supported, HARQ-ACK, and other timing is applied at the next subframe after the timing. For example, if PCell transmits scheduling at subframe n which cross-subframe schedules data at n+1, the subframe, starting with index n+1 of SCell, may carry the data. It is assumed that subframe index of SCell is always follow PCell and the starting time of the same subframe index of SCell is later than PCell. In case HARQ-ACK which may be transmitted at n+4$^{th}$ subframe when a UE receives data at subframe n, in this case, PCell timing is faster, HARQ-ACK is transmitted at n+5$^{th}$ subframe rather than n+4$^{th}$ to allow sufficient UE processing time. More complicate mechanisms may be necessary.

FIG. 6 shows an example of cooperation of LTE-U eNBs to prevent hidden-nodes from a UE according to an embodiment of the present invention. Referring to FIG. 6, a UE may exist in an overlapping region between LTE-U eNB coverage and Wi-Fi device sensing range. In this case, for example, from UE1 perspective, even though LTE-U eNB transmits the data, the neighbor AP may not sense the LTE-U carrier. Thus, neighbor AP, which is a hidden-node from LTE-U eNB, may transmit the signals. In FIG. 6, Lu1 and AP1 may be hidden-nodes to each other. Thus, AP1 may transmit signals while Lu1 is transmitting, and then, UE1 may experience heavy interference and the channel quality may become very low. To enhance the situation, LTE-U eNBs may be collaborated according to an embodiment of the present invention. For example, Lu1, Lu2 and Lu3 may collaborate and transmit known signals (such as primary synchronization signal (PSS)/secondary synchronization signal (SSS)), during non-data transmission period to create larger sensing range for Wi-Fi perspective.

FIG. 7 shows another example of cooperation of LTE-U eNBs to prevent hidden-nodes from a UE according to an embodiment of the present invention. Referring to FIG. 7, data transmission from each LTE-U eNB may take time division multiplexing (TDM) approach. Specifically, in the first time interval, Lu1 transmits data, but Lu2/Lu3 transmits RS. In the second time interval, Lu2 transmits data, but Lu1/Lu3 transmits RS. In the third time interval, Lu3 transmits data, but Lu1/Lu2 transmits RS. A UE may cancel the known signals to read data scheduled to itself. The benefit of this approach is to allow larger coverage of LTE-U eNB and thus reduces hidden-node issue with coexisting AP devices, and it also allows coexistence among LTE-U eNBs as well via TDM. It may be further considerable to reserve some time for Wi-Fi usage, as the larger coverage by collaborating LTE-U eNBs may lead starvation of Wi-Fi devices. In FIG. 7, in fourth time interval, there is no transmission from Lu1/Lu2/Lu3.

For cooperation of TDM data transmission, regardless of whether the network may perform carrier sensing before transmission or not to determine the status of medium, it may be considered to apply TDM approach among LTE-U eNBs.

Assuming that TDM approach between Wi-Fi and LTE is used, where LTE occupies only the portion of time so that Wi-Fi devices can utilize the medium during the time when LTE is not using Wi-Fi, how to coordinate resources among LTE eNBs of different operators dynamically may be considered according to an embodiment of the present invention. First approach is to let each eNB perform carrier sensing regardless of Wi-Fi devices or LTE-U eNBs. Each eNB may transmit data only if the channel is idle (i.e., not used by LTE-U or Wi-Fi). In this case, hidden-node issue described above may not be addressed, unless the UEs perform carrier sensing as well. Second approach is to use reserved ID for LTE-U eNBs when transmit opportunity (TxOP) is requested via request to send (RTS)/clear to send (CTS) so that the other LTE eNBs know that TxOP has been requested by neighbor LTE eNB. If the channel is idle other than TxOP request, the LTE eNB, which has received TxOP request from another LTE eNB, may assume that the channel is available. Or, this may be simply implemented by not decoding TxOP request by LTE eNBs and LTE eNBs may attempt to use the channel whenever the channel becomes idle. The drawback of this approach is that LTE eNB will not be aware of neighbor LTE eNB transmission so that LTE eNBs may interfere each other considerably.

Another approach is that an eNB, which is a controller, may perform carrier sensing and indicate that the channel is IDLE via backhaul (assuming ideal backhaul) to initiate the starting of LTE transmission timing. Another approach is to use LTE-premable, which is used to determine whether the channel is used by non-LTE devices or LTE devices. Another approach is that each eNB may listen on Wi-Fi signals such that if there is no network allocation vector (NAV) setting though the channel is sensed as rather busy, it may initiate the transmission.

Thus, according to an embodiment of the present invention, LTE duration may be started whenever at least one LTE device has requested TxOP and the channel is IDLE other than TxOP request. In terms of occupying the channel so that Wi-Fi devices will not attempt to transmit data, once LTE transmission time starts, all eNBs may transmit signals (known sequence RS if there is no data transmission or data). To further enhance data reception quality, further coordination among LTE eNBs may be considered. As another alternative, L1 signaling based dynamic coordination may be considered.

L1 signaling to coordinate scheduling among LTE-U eNBs may be similar to TxOP operation as a simple approach. Assuming synchronized network, the eNB, which may not have any data to transmit, may listen on L1 signaling from other eNB(s), which may include the duration of active time. Based on the active time duration, the other eNB may transmit known sequence RS to mitigate hidden-node issue. This may be based on the assumption that dynamic coexistence mechanism based on carrier sensing is applied.

On the other hand, if carrier sensing between non-LTE and LTE system may not be in placed, it may be considered to have semi-static TDM resource partitioning between non-LTE and LTE system. One way to do this is via setting up policy control function (PCF) like operation, such that LTE eNBs can utilize some portion of resource without interference from Wi-Fi devices. However, this needs to assume that Wi-Fi devices can understand PCF operation which is not mandated in Wi-Fi system. Thus, there may be potentially some interference from Wi-Fi devices/APs which may not understand the PCF operation.

Thus, to prevent Wi-Fi device interference, as mentioned above, each eNB may transmit known sequence in resources assigned to LTE operation according to an embodiment of the present invention. During the time assigned to LTE operation, coordination among LTE-eNBs may be done via L1 signaling. One approach is to use central controller which assigns the resource partitioning among eNBs. Another approach is to use distributed approach where each eNB transmits the L1 signaling which includes on/off pattern. In this case, a mechanism for each eNB to listen on the other eNB(s) is needed. For that, periodic transmission/reception may be considered by defining a pattern that each eNB is using to transmit L1 signaling. For example, if L1 signaling is transmitted in every 100 ms, L1 signaling may be transmitted by an eNB at $1^{st}$ subframe of a radio frame during 10 radio frames where each eNB can take a turn in each radio frame based on predefined pattern or coordinated pattern via backhaul signaling. This is similar to eNB discovery mechanism.

FIG. 8 shows an example of a method for performing cooperation between LTE-U eNBs according to an embodiment of the present invention. In step S100, the UE receives a reference signal from a plurality of LTE-U eNBs. In step S110, the UE receives first data from a first LTE-U eNB, among the plurality of LTE-U eNBs, in a first time interval. In step S120, the UE receives second data from a second LTE-U eNB, among the plurality of LTE-U eNBs, in a second time interval. That is, the first/second LTE-U eNBs take TDM approach. The embodiment of the present invention described above may be applied to this embodiment of the present invention.

Hereinafter, configuration of synchronization reference according to an embodiment of the present invention is described. As unlicensed carrier may not be able to transmit deterministic tracking signals such as PSS/SSS/cell-specific reference signal (CRS) periodically, it is desirable to minimize synchronization requirement that a device needs to perform in an unlicensed carrier. Assuming that LTE-U AP is collocated with a LTE eNB, it may be assumed that a UE may be able to perform coarse time/frequency tracking using signals transmitted by licensed carrier. This carrier may be called a (tracking) reference carrier. In terms of determining the reference carrier, the following options may be considered.

1) Configure a frequency: Assuming that small cells in a frequency have associated LTE-U AP functionality, the network may configure a frequency for time/frequency tracking reference carrier where the UE searches the best cell in that frequency and perform time/frequency tracking. The selected best cell may be used for the best cell for LTE-U carrier as well. Or, separate cell selection may be performed. However, in terms of time/frequency tracking, the chosen best cell in the licensed carrier may be used. This may work in a case where small cells are synchronized each other, and thus, any cell may be used as a reference for another cell. Or, a network may limit the configuration of unlicensed carrier to the cell which is chosen as a best cell in a licensed carrier, such that only collocated licensed carrier can be used as a reference for LTE-U carrier. Also, it may be considered that LTE-U carrier may transmit tracking RS or beacon in another frequency. Thus, tracking may be performed in different frequency indicated by higher layer.

2) Configure a carrier: Assuming that the network may find the best LTE-U carrier to a specific UE via either UL signals or other measurements, the network may also configure the reference carrier for the LTE-U carrier where the UE can perform coarse time/frequency tracking. Typically, the network may configure the collocated licensed carrier to LTE-U carrier, however, if the synchronization among cells is achieved, non-collocated carrier may be configured as a reference. When a carrier is configured by higher layer, the UE may use PSS/SSS and/or CRS from the reference carrier for time/frequency tracking. For the carrier, it may be cell ID or transmission point (TP) scrambling identity, as the reference carrier may be a cell or TP.

It is also noted that a set of carriers may be configured such that a UE may assume the same time/frequency for the carriers configured in the same group. When a UE acquires synchronization signals from any of carriers belonging to the same group, the group may be used as a reference for time/frequency synchronization. In other words, the reference carrier/frequency may be multiple.

In terms of configuring a carrier or frequency as described above, the following additional information may be also considered.

Type of RS used for time/frequency tracking: if PSS/SSS/CRS is not used, type of RS usable for tracking may be also signaled. For example, LTE-U carrier itself may be configured by higher layer where preamble may be used for time/frequency tracking.

Antenna ports and number: if not available by other means such as dedicated signaling in SCell configuration, information of antenna ports and number may be given for tracking.

Bandwidth: if not available by other means, bandwidth of RS transmission may be also notified.

Periodicity and offset: if not transmitted continuously or followed by the specification, additional information on periodicity and offset may be signaled. One example is that if a beacon-type tracking RS is transmitted in a different frequency, it may not be transmitted continuously. Thus, periodicity and offset can be configured aligned with RS transmission. Another example is that discovery signals used for such as cell ON/OFF where the reference cell may perform ON/OFF may be used for tracking. In that case, information on periodicity and offset may be indicated.

Generally, a cell or a TP may be a reference carrier for a LTE-U carrier. When a reference carrier is configured, the UE may assume that timing/frequency tracking may be attempted based on RS transmitted by the reference carrier. It may be further assumed that RS from the reference carrier and data demodulation RS, such as CRS or UE-specific RS, have quasi-colocation (QCL) relationship in terms of at least received timing.

Furthermore, it may be also considerable to configure a reference TP in the same frequency where LTE-U carrier exists. For example, there are a few LTE-U TPs where one of them can transmit periodic discovery or tracking RS signal transmission. In that case, the TP may be used as a common time/frequency tracking reference where TPs will synchronize each other via external means or via air-interface. In this case, the UE may be configured that the reference TP and such as CSI-RS of the target TP have QCL relationship in terms of at least Doppler shift, and Doppler spread.

FIG. 9 shows an example of a method for performing time/frequency tracking according to an embodiment of the present invention.

In step S200, the UE receives a configuration of a frequency or a carrier for a time/frequency tracking reference carrier. The time/frequency tracking reference carrier may be a licensed carrier of 3GPP LTE. The time/frequency tracking reference carrier may be determined based on the received configuration of the frequency, by searching the best cell in the frequency. The time/frequency tracking reference carrier may be determined based on the received configuration of the carrier.

In step S210, the UE performs time/frequency tracking in an unlicensed carrier based on the received configuration. The UE may further receive a signal from the time/frequency tracking reference carrier used for the time/frequency tracking in the unlicensed carrier. The signal may be one of a PSS/SSS/CRS. The time/frequency tracking reference carrier and the unlicensed carrier may be collocated or non-collocated. The time/frequency tracking reference carrier and the unlicensed carrier may have the same frequency. The UE may further receive at least one of information on a type of a reference signal used for the time/frequency tracking, information on antenna ports or a number of the antenna ports, information on a bandwidth, or information on a periodicity and offset of a signal.

FIG. 10 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a user equipment (UE), time/frequency tracking in a wireless communication system, the method comprising:
   receiving a configuration of a frequency for a time/frequency tracking reference carrier, wherein the time/frequency tracking reference carrier is a licensed carrier of 3rd generation partnership project (3GPP) long-term evolution (LTE);
   searching for a best cell in the frequency;
   determining the time/frequency tracking reference carrier which corresponds to the best cell;
   receiving a signal from the determined time/frequency tracking reference carrier used for the time/frequency tracking in an unlicensed carrier;
   performing the time/frequency tracking in the unlicensed carrier based on the signal;
   receiving information on a type of a reference signal used for the time/frequency tracking,
   wherein the time/frequency tracking reference carrier and the unlicensed carrier have the same frequency.

2. The method of claim 1, wherein the signal is one of a primary synchronization signal (PSS), a secondary synchronization signal (SSS) or a cell-specific reference signal (CRS).

3. The method of claim 1, further comprising determining the time/frequency tracking reference carrier based on the received configuration of the carrier.

4. The method of claim 1, wherein the time/frequency tracking reference carrier and the unlicensed carrier are collocated.

5. The method of claim 1, wherein the time/frequency tracking reference carrier and the unlicensed carrier are non-collocated.

6. The method of claim 1, further comprising receiving information on antenna ports or a number of the antenna ports.

7. The method of claim 1, further comprising receiving information on a bandwidth.

8. The method of claim 1, further comprising receiving information on a periodicity and offset of a signal.

9. A user equipment (UE) comprising:
   a memory;
   a transceiver; and
   a processor coupled to the memory and the transceiver, and configured to:
      control the transceiver to receive a configuration of a frequency for a time/frequency tracking reference carrier, wherein the time/frequency tracking reference carrier is a licensed carrier of 3rd generation partnership project (3GPP) long-term evolution (LTE), (LTE);
      search for a best cell in the frequency, frequency;
      determine the time/frequency tracking reference carrier which corresponds to the best cell, cell;
      receive a signal from the determined time/frequency tracking reference carrier used for the time/frequency tracking in an unlicensed carrier, carrier; and
      perform the time/frequency tracking in the unlicensed carrier based on the signal, and
      receive information on a type of a reference signal used for the time/frequency tracking, wherein the time/frequency tracking reference carrier and the unlicensed carrier have the same frequency.

* * * * *